(12) United States Patent
Wyatt et al.

(10) Patent No.: US 12,350,718 B2
(45) Date of Patent: Jul. 8, 2025

(54) WATERPROOFING OF A MODULAR HEAD CLEANING SYSTEM

(71) Applicant: Crossford International, LLC, Stamford, CT (US)

(72) Inventors: Gregory Wyatt, Stamford, CT (US); Timothy J. Kane, Stamford, CT (US); Evan Reyes, Stamford, CT (US); Russell Barnes, Stamford, CT (US); Robert Folchi, Stamford, CT (US)

(73) Assignee: Crossford International, LLC, Stamford, CT (US)

( * ) Notice: Subject to any disclaimer, the term of this patent is extended or adjusted under 35 U.S.C. 154(b) by 0 days.

(21) Appl. No.: 18/623,586

(22) Filed: Apr. 1, 2024

(65) Prior Publication Data

US 2024/0269712 A1    Aug. 15, 2024

Related U.S. Application Data

(63) Continuation-in-part of application No. 18/327,174, filed on Jun. 1, 2023, which is a continuation of
(Continued)

(51) Int. Cl.
*G05B 15/02* (2006.01)
*B08B 1/20* (2024.01)
(Continued)

(52) U.S. Cl.
CPC ............... *B08B 1/20* (2024.01); *B08B 15/00* (2013.01); *G05B 15/02* (2013.01); *B65G 45/18* (2013.01); *B65G 45/22* (2013.01); *B65G 45/24* (2013.01)

(58) Field of Classification Search
CPC ........... B08B 1/20; B08B 15/00; G05B 15/02; B65G 45/18; B65G 45/22; B65G 45/24
See application file for complete search history.

(56) References Cited

U.S. PATENT DOCUMENTS

| | | | | |
|---|---|---|---|---|
| 5,189,936 A | * | 3/1993 | Gerber | B26D 7/20 |
| | | | | 83/451 |
| 5,706,932 A | * | 1/1998 | White | B65G 45/22 |
| | | | | 15/302 |

(Continued)

FOREIGN PATENT DOCUMENTS

| | | | |
|---|---|---|---|
| CN | 110626749 A | * | 12/2019 |
| CN | 113443327 A | | 9/2021 |
| KR | 20140146363 A | * | 12/2014 |

OTHER PUBLICATIONS

CN-110626749-A, Machine Translation (Year: 2024).*
KR-20140146363-A, Machine Translation. (Year: 2024).*

*Primary Examiner* — Joshua L Allen
*Assistant Examiner* — Christopher Remavege
(74) *Attorney, Agent, or Firm* — Tatonetti IP

(57) ABSTRACT

A conveyor belt cleaning system is configured with waterproofing techniques throughout its entire body to prevent liquid from entering liquid-sensitive portions of the cleaning system, thereby reducing machine downtime or destruction. The conveyor belt cleaning system has a touchscreen control panel (i.e., a computing device) that controls the modular cleaning system's operations and one or more actuators that facilitate directional movement of the modular cleaning head. The control panel is comprised of the display, such as a touchscreen display, and the various computer-related components that effectuate the computer's operations, such as one or more processors (CPUs, GPUs, etc.), long and short-term hardware-based memory devices such as Flash memory, ROM (Read-Only Memory), RAM (Random Access Memory), etc., network interface cards (NICs) for Wi-Fi, Bluetooth® and other wired and wireless forms of communications, among other operational components.

14 Claims, 11 Drawing Sheets

Related U.S. Application Data application No. 17/805,727, filed on Jun. 7, 2022, now Pat. No. 11,667,475, which is a continuation-in-part of application No. 17/658,835, filed on Apr. 12, 2022, now Pat. No. 11,565,888.

(60) Provisional application No. 63/583,267, filed on Sep. 17, 2023.

(51) Int. Cl.
*B08B 15/00* (2006.01)
*B65G 45/18* (2006.01)
*B65G 45/22* (2006.01)
*B65G 45/24* (2006.01)

(56) References Cited

U.S. PATENT DOCUMENTS

| | | | | |
|---|---|---|---|---|
| 6,058,556 A * | 5/2000 | Jones | ................ | B08B 5/04 15/302 |
| 6,986,418 B2 * | 1/2006 | Swinderman | .......... | B65G 45/12 198/502.1 |
| 7,293,572 B2 * | 11/2007 | Honkala | ................ | B08B 3/022 118/317 |
| 7,784,476 B2 * | 8/2010 | Handy | ................ | B08B 1/30 134/172 |
| 8,624,203 B2 * | 1/2014 | Tullo | ................ | A61L 2/10 250/492.1 |
| 9,032,976 B2 * | 5/2015 | Berntsen | ................ | B65G 45/22 134/131 |
| 9,376,264 B1 * | 6/2016 | Foley | ................ | B65G 47/72 |
| 10,150,623 B2 * | 12/2018 | Handy | ................ | B05B 13/0478 |
| 10,604,354 B2 * | 3/2020 | Handy | ................ | B65G 45/22 |
| 10,829,312 B2 * | 11/2020 | Harrison | ................ | B65G 45/16 |
| 10,954,077 B1 * | 3/2021 | Yoo | ................ | B65G 45/22 |
| 11,485,585 B1 * | 11/2022 | Bitondo | ................ | B65G 45/22 |
| 11,661,288 B1 * | 5/2023 | Kane | ................ | B08B 1/12 198/496 |
| 11,760,581 B2 | 9/2023 | Robinson | | |
| 11,781,898 B2 * | 10/2023 | Hirani | ................ | G01G 17/02 177/50 |
| 12,006,160 B2 * | 6/2024 | DeVries | ................ | B65G 43/00 |
| 2006/0236473 A1 * | 10/2006 | Jaffe | ................ | A46B 5/0008 15/4 |
| 2007/0170040 A1 * | 7/2007 | Handy | ................ | B08B 1/32 198/495 |
| 2008/0094786 A1 * | 4/2008 | Liou | ................ | H04N 5/64 206/811 |
| 2015/0077912 A1 * | 3/2015 | Ishibashi | ................ | G04C 10/00 361/679.55 |
| 2019/0084773 A1 * | 3/2019 | Handy | ................ | B65G 45/22 |
| 2019/0226756 A1 * | 7/2019 | DeBoer | ................ | G05B 15/02 |
| 2019/0383417 A1 * | 12/2019 | Mazin | ................ | F15B 15/18 |
| 2020/0029823 A1 * | 1/2020 | Dong | ................ | A61B 5/02141 |
| 2020/0100614 A1 * | 4/2020 | Yao | ................ | A47J 36/321 |
| 2020/0300689 A1 * | 9/2020 | Hirani | ................ | B65G 41/006 |
| 2023/0056544 A1 * | 2/2023 | DeVries | ................ | B65G 43/02 |

\* cited by examiner

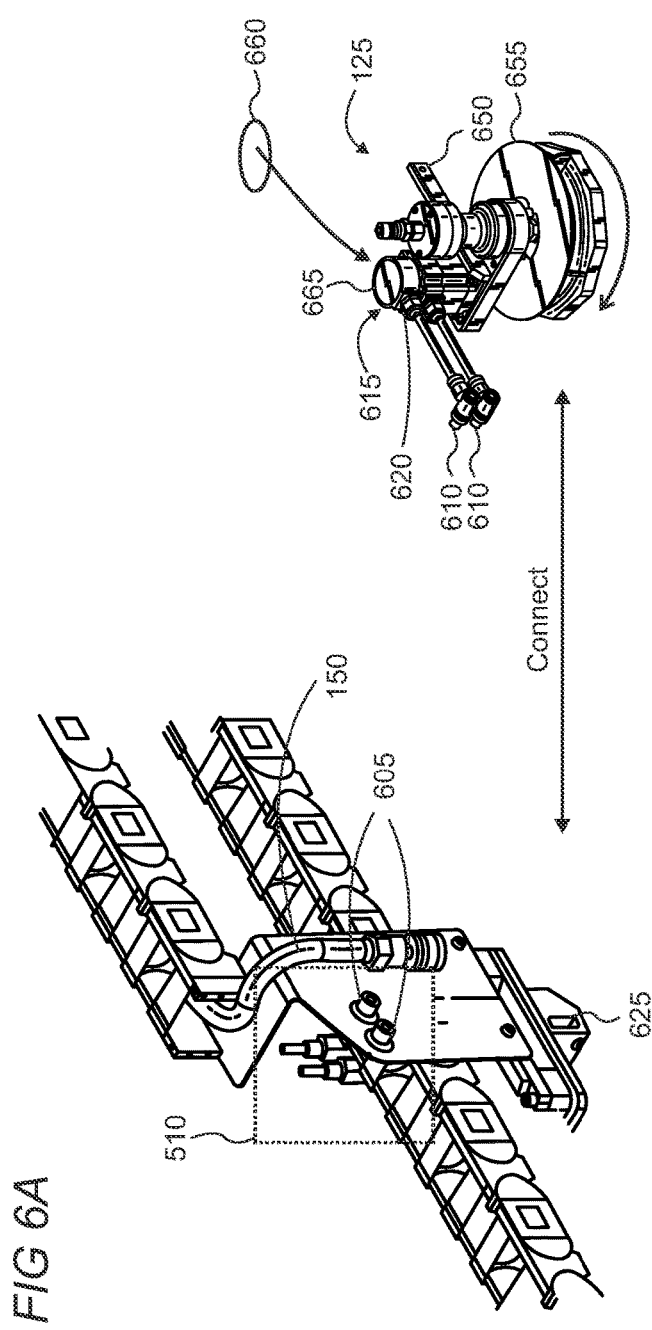
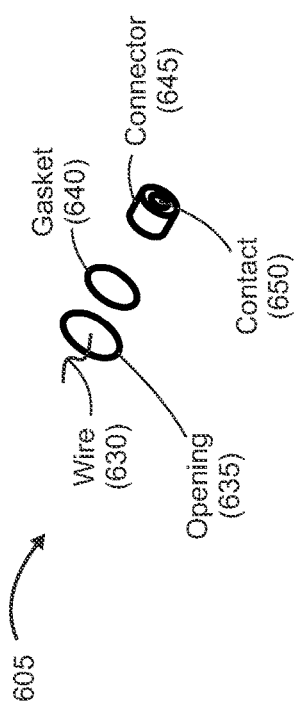
FIG 6A
FIG 6B

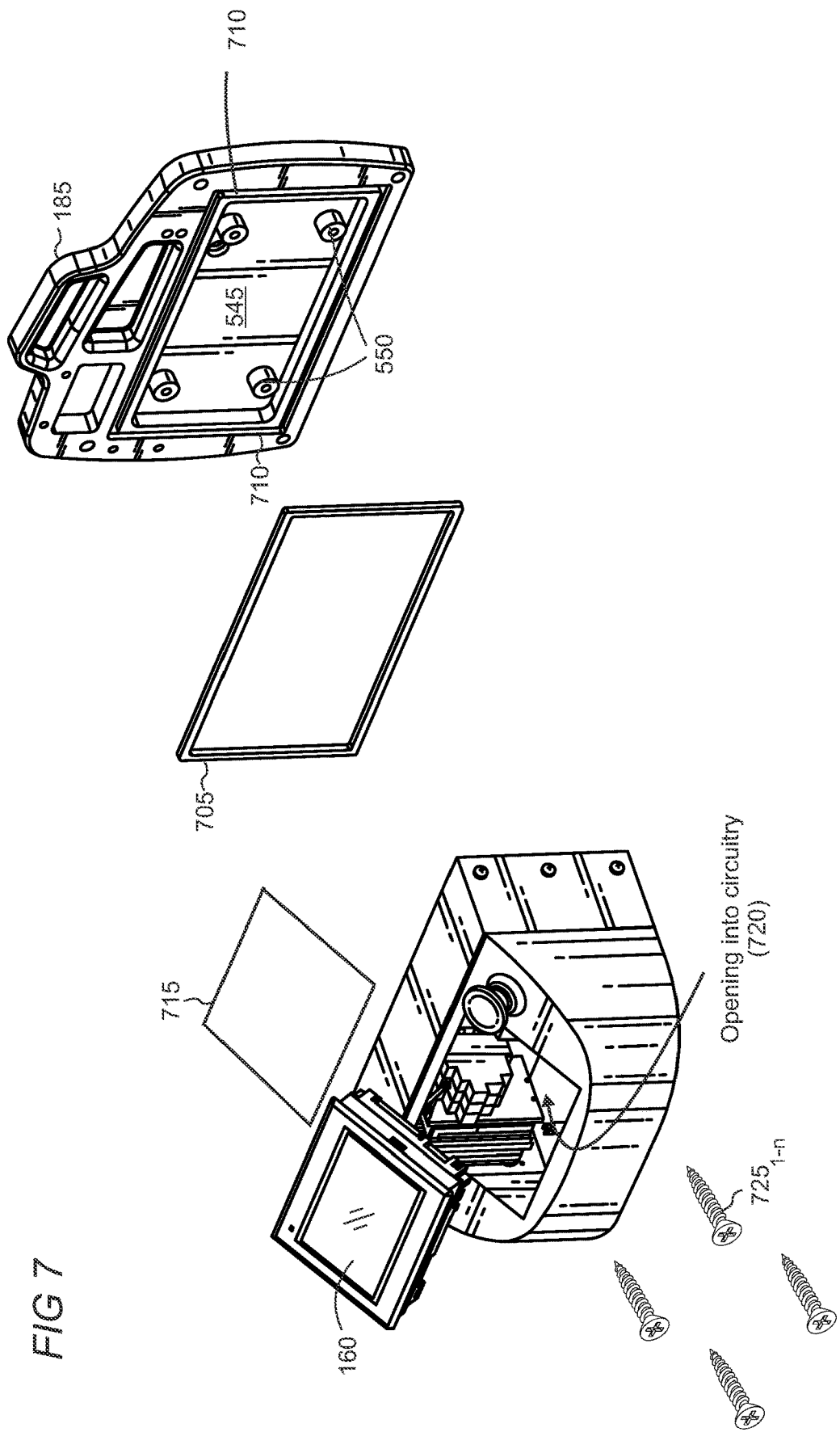

WATERPROOFING OF A MODULAR HEAD CLEANING SYSTEM

CROSS-REFERENCES TO RELATED APPLICATIONS

This Non-Provisional Patent Application claims the benefit of and priority to Provisional Patent Application Ser. No. 63/583,267, filed Sep. 17, 2023, entitled "Waterproofing of a Modular Head Cleaning System," the entire contents of which are hereby incorporated herein by reference.

This Non-Provisional Patent Application claims the benefit of and priority to Non-Provisional patent application Ser. No. 18/327,174, filed Jun. 1, 2023, entitled "Utilizing a Non-Contact Sensor to Detect a Length or Speed of a Movable Surface," which claims the benefit of and priority to Non-Provisional patent application Ser. No. 17/805,727 (U.S. Pat. No. 11,667,475), filed Jun. 7, 2022, entitled "Conveyor Belt Cleaning Device having Modularity and Real-Time Cleaning Adjustments based on Sensory Input," which is a Continuation-In-Part of Non-Provisional patent application Ser. No. 17/658,835 (U.S. Pat. No. 11,565,888), filed Apr. 12, 2022, entitled "Modular Head Cleaning Device and System," the entire contents of each application of which are hereby incorporated herein by reference.

BACKGROUND

Modular head cleaning systems are deployed to clean contaminants, debris, foodstuffs, etc., from conveyor belts and other movable surfaces in a variety of industries. The conveyor belt cleaning systems deploy a computerized control panel that controls the cleaning system's operations, such as the manner in which the cleaning head cleans the belt. One or more actuators may also be deployed to control the directional movement of the modular head in all directions, including along an x, y, z, and rotational axes.

While these machines are tasked with cleaning conveyor belts, the machines themselves become dirtied during operation or otherwise. The conveyor belt cleaning system may be cleaned with a water hose, pressurized or otherwise, which can cause problems if water enters any one or more of the machine's electrical, mechanical, or electromechanical components, including causing corrosion, damage to electrical and computer components running software, electrical shock, etc.

SUMMARY

A conveyor belt cleaning system is configured with waterproofing techniques and configurations throughout its entire body to prevent liquid from entering liquid-sensitive portions of the cleaning system, thereby reducing machine downtime or destruction and improving operator safety. The conveyor belt cleaning system has a touchscreen control panel (i.e., a computing device) that controls the modular cleaning system's operations and one or more actuators that facilitate directional movement of the modular cleaning head. The control panel is comprised of the display, such as a touchscreen display, and the various computer-related components that effectuate the computer's operations, such as one or more processors (CPUs, GPUs, etc.), long and short-term hardware-based memory devices such as Flash memory, ROM (Read Only Memory), RAM (Random Access Memory), etc., network interface cards (NICs) for Wi-Fi, Bluetooth® and other wired and wireless forms of communications, among other operational components.

The touchscreen display utilizes a gasket when securing to the control panel's dedicated opening to ensure water cannot enter the control panel—and thus its electrical components—via the touchscreen's surroundings. The control panel's backside also utilizes a dedicated gasket positioned between the control panel's backside and the cleaning system's backing plate frame to which the control panel attaches. The backing plate has a channel corresponding to the shape and size of the gasket so that the frame at least partially encapsulates the gasket-thereby providing a sealed environment preventing water or other liquids from entering the control panel's internal circuitry and electrical components. The gasket rests tightly against a flat surface on the control panel.

Furthermore, some electrical components are sealed away separately from the control panel. For example, the one or more actuators that facilitate modular cleaning head movement in various directions are located outside electrical control areas to prevent additional openings into the control panel and thereby better seal the control panel's components.

For example, one of the modular cleaning system's linear actuators perpendicular to the conveyor belt's directional movement, which translates to the perpendicular directional movement of the modular cleaning head relative to the conveyor belt or other movable surface. The linear actuator extends from end to end on the chassis frame, between the backing plate and an adjustable end frame, providing additional support for the structure. The actuator's motor is positioned on the adjustable end frame which is on a side opposite the control panel, and the actuator is completely outside the control panel, enabling individualized and assured waterproofing of the components. The end cap housing of the actuator, on the back plate and the adjustable end frame, are sealed with a gasket, and any wires that enter the control panel from the actuator are also sealed within a housing with a customized gasket that prevents any liquid or debris from entering the control panel.

Wires between the control panel and linear actuator extend through a waterproof plug and connector on the control panel. The control panel's connector is sealed with a waterproof gasket so that only its mechanical connection and metallic contact points are exposed, but its interior is completely sealed {examples of two such connectors are shown in FIG. 9, below waterproof plug #905. These connectors currently do not have labels associated}. The modular cleaning head mechanically attaches to the chassis frame and electrically connects to connectors near the center region of the cleaning system and the actuator.

While the linear actuator provides linear motion of the modular cleaning head, the motor and electrical components within the modular head provide rotational movement against the surface that is being cleaned. The motor and the modular cleaning head's components are also waterproofed using gaskets at every connection point to prevent liquid intrusion into the device. Thus, the entire modular cleaning system is sealed from water from end to end, at least with respect to any electrical, computer-based, and corrosion-sensitive components.

One or more additional actuators are adapted for other modular head directional movements, such as parallel or diagonal to the conveyor belt, or even to enable hovering the modular head above the conveyor belt. These actuators may likewise be waterproofed by placing their components (e.g., motor, gears, lead screw, etc.) outside of the control panel and making any wired connections to the control panel waterproof with, for example, gaskets. Thus, any electrical connections, such as the wired connections that connect to the movable modular head, are sealed from water intrusion, such as with a gasket between the receptacle and the modular head's connector.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture, such as one or more computer-readable storage media. These and various other features will be apparent from reading the following Detailed Description and reviewing the associated drawings.

DESCRIPTION OF THE DRAWINGS

FIGS. 6A and 6B show an illustrative representation of the modular cleaning head's waterproofed components and its connection points with the cleaning system's frame;

FIG. 7 shows an illustrative exploded representation of the various gaskets and layout of the control panel and the frame's backing plate;

Like reference numerals indicate like elements in the drawings. Elements are not drawn to scale unless otherwise indicated.

DETAILED DESCRIPTION

Figure 1A:
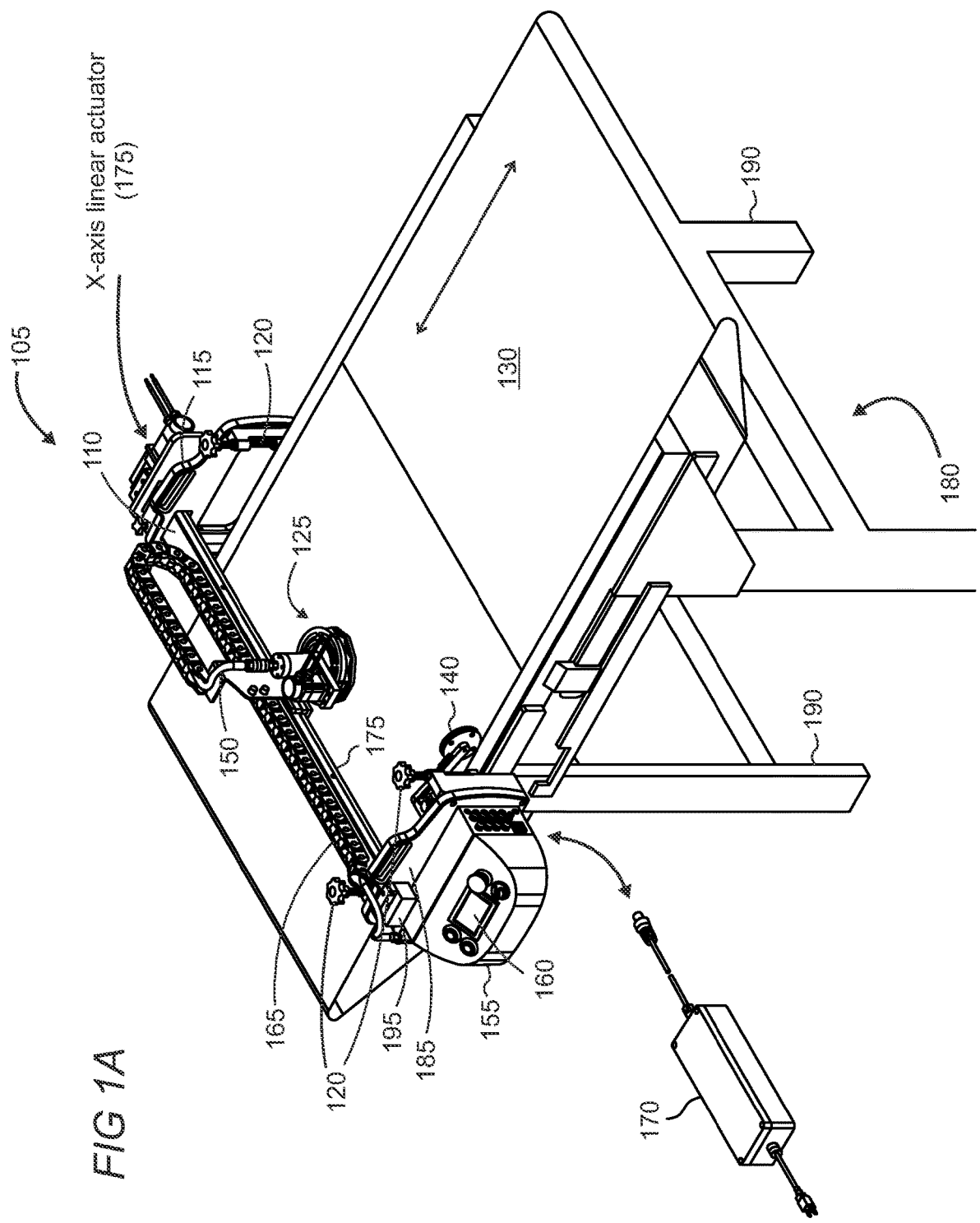
FIGS. 1A and 1B show illustrative representations of a conveyor belt cleaning device.
Figure 1B:
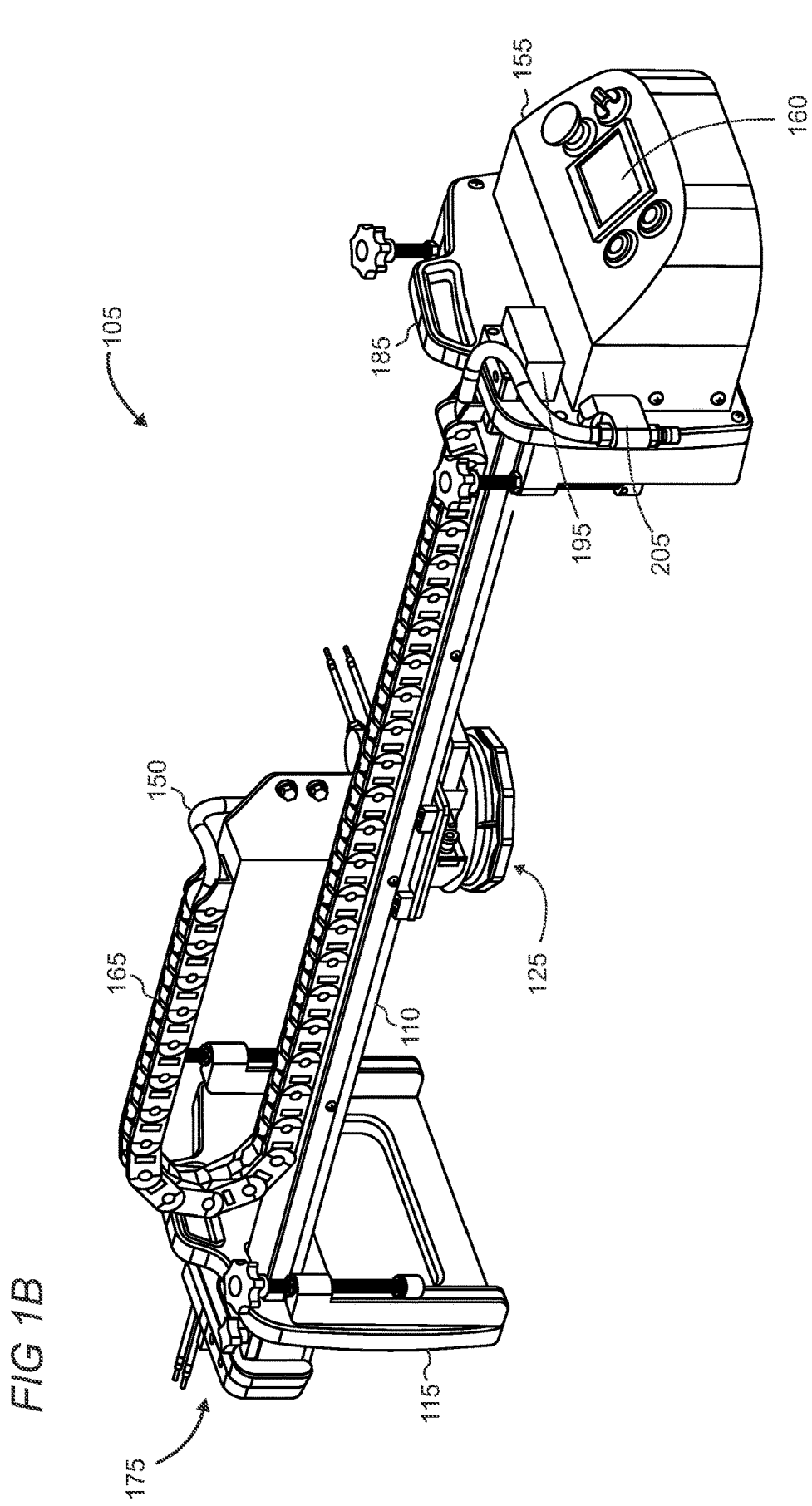

FIGS. 1A and 1B show illustrative representations of a cleaning device 105 that employs a cleaning head 125 to clean an advancing conveyor belt 130. Although a specific cleaning head 125 is shown, multiple types of cleaning heads can be connected to and disconnected from the cleaning device's frame 110, as discussed in greater detail below. The capability to use different cleaning heads enables a variety of cleaning techniques on a conveyor belt and reduces wear and tear on a given cleaning head. The cleaning device 105 relies on gravity and friction to hold the entire device in place on the body or frame adjacent to the conveyor belt 130. As discussed in further detail below, the vertical height adjustment component 120 or a vertical actuator engages against the conveyor belt's body or frame and can be used to adjust the height of the cleaning device. The handles on opposing ends of the cleaning device enable a user to lift the device from the conveyor belt.

The cleaning head 125 is configured as a rotary cleaning head that may or may not-depending on the implementation-dispense a chemical (e.g., detergent, bleach, etc.), water, steam, or air at the conveyor belt. The cleaning head is configured to perform some cleaning action at the conveyor belt 130 either by directly contacting the belt's surface, by outputting a medium (chemical, water, steam, air) to the belt's surface, or by a combination of the two. The cleaning action causes the cleaning head to remove any particulates or debris and ultimately clean the conveyor belt.

The cleaning head 125 and the conveyor belt 130 are supported by a base assembly 180, including a series of legs 190 that rests against a base or ground. While a conveyor belt is shown in the drawings, the present system can be used with other cleaning systems as well, such as conveyor belts or movable surfaces suspended from a wall, ceiling, etc. Thus, the present disclosure is not limited to the conveyor belt herein. The base assembly and legs may be comprised of a metal or other suitable material that has sufficient strength to support the cleaning device 105 and conveyor belt 130, among other components.

The cleaning device 105 includes a frame 110 that may be constructed of metal or plastic, such as plastic polycarbonate, but other materials may also be used that perform like functions herein. The frame extends across the width ends of the cleaning device and the conveyor belt 130. An adjustable end frame 115 affixes the cleaning device's body to the conveyor belt 130 or the belt's frame or body. The adjustable end frame 115 can move inward toward the opposite end of the conveyor belt, such as toward the control panel 155, to enable the cleaning device to customizably fit various conveyor belt sizes. An opposite end frame 185 may be statically positioned.

A wire carriage 165 connects and translatably moves with the cleaning head 125. The wire carriage may be comprised of metal, plastic, or other suitable material. The wire carriage 165 moves transverse to the direction of the conveyor belt 130 via the x-axis linear actuator 175 and its components, which may include a motor, transmission, shaft, mount, and gears (not shown in FIGS. 1A-B). The actuator motor and electrical connections are protected and sealed from ingress of liquids and dust within the end caps 195, such as at a level of IP56. The end caps utilize a gasket against the support structure, to which the actuator's motor is secured, to ensure liquid or other debris cannot enter the actuator's internal operating components.

The use of gaskets and other sealing techniques and configurations of the cleaning device 105 may have an Ingress Protection (IP) rating of 56, thereby making the system waterproof from water projected from jets or splashed against the machine. In this regard, since the purpose of the system is to clean conveyor belts or other surfaces, including foodstuffs such as seeds, users may wash down the device periodically to clean any splashing debris. Users may use hoses or nozzles that shoot streams at the device to adequately clean its various components, including its actuator, control panel, carriage, cleaning head, etc. Thus, the current configuration for IP56 protections provides a layer of dust and water protection to prolong the device's shelf life and prevent downtime due to breakage resulting from dust, particles, or water entering its delicate components (e.g., computer and mechanical hardware). Thus, any discussion of protection, sealing, and/or waterproofing of the cleaning device 105 and its components, such as using gaskets, is configured with dust and waterproofing of at least IP56.

Furthermore, while an IP56 rating is described herein, other IP ratings may also be possible depeneding on the specific implementation. For example, receiving greater protection, such as IP66, and maybe a lower standard of IP55 is also possible. Thus, while the description herein and the level of IP protections are not meant to be limiting, the current cleaning device's benefit is that it can be cleaned and utilized repeatedly while preventing downtime, damage, and the like-whether permanent or temporary. The present design configurations and decisions were created to make a long-lasting product that is cleanable, such as with jet-streams of water, without damaging the machine. Also, if small foodstuffs, like seeds, poppy seeds, mashed up other debris, or wet material splatters against the machine, the cleaning device 105 will be able to withstand such exposure and continue operating, contrary to other machines that are not as elegantly designed and therefore break down too easily.

Various types of actuators may be utilized to move the cleaning device 105, such as linear or rotational actuators. A motor, such as electric, air, or gas-powered, is generally connected to the linear actuator by a flexible coupling or a belt, enabling the motor to be mounted either axially or perpendicular to the linear actuator. A variety of motor sizes can be mounted to these actuators depending on requirements and the specific implementation. The linear actuator has linear bearings that support the moving payload, as well as rotary bearings that support either the lead screw, ball screw, or belt pulleys.

A lead screw actuator uses a plain screw/nut arrangement to translate the rotary motion from a motor to linear motion. A manually driven screw or an AC (alternating current) induction motor are some methods to supply the rotary motion. The actuator's ability to back drive is reduced over ball screw actuators due to the low efficiency of the screw/nut. In some applications, this can be an advantage as it helps to keep the payload stationary while not in motion.

A ball screw actuator may use a high-precision nut with recirculating ball bearings that rotate around a ground screw thread. The advantages of this system are high precision and low friction, giving an efficient method of converting rotary motion to linear motion. Stepper or servo motors may be used to supply the rotary motion.

Belt actuators work where a belt is carried between two pulleys and attached to the moving carriage, then, as the belt rotates, the carriage is pulled along the actuator. One of the pulleys is driven by a motor generally mounted perpendicular to the actuator and coupled using a flexible coupling. Belt-driven linear actuators may be effective for long travel and high linear speed applications. Any one of these actuator configurations and mechanisms is usable with the present system. While this discussion is with respect to the x-axis actuator, similar actuators may be utilized for the y-, z-, and rotational axis actuators, as discussed in greater detail below.

The endcaps 195 of the actuator 175 may house and seal off and waterproof various liquid-sensitive components, such as the motor, pulley, and bearings. However, while the actuator is part of the frame 110, other components of the actuator that are unaffected by liquid may be exposed since liquid, foodstuffs, and other debris will not affect its operation, such as the linear guide track.

The wire carriage 165 moves with the cleaning head's variety of directional movements on the conveyor belt 130, including x-axis, y-axis, z-axis, and a-axis (rotational) movements, as discussed in greater detail below. A tube 150 is positioned and extends within the wire carriage 165 to transport liquids, steam, or other dispensable materials. One end of the tube 150 connects to the cleaning head 125 for output of the air, steam, or liquid, and the other end may be connected to a reservoir to provide such materials to the cleaning device. The wire carriage 165 functions as an energy chain for various items, including cables (e.g., bus, data, fiber optic, etc.) and energy sources (e.g., electricity, gas, air, and liquids). The wire carriage provides protection and manipulation of the wires during the movement of the cleaning head.

The wires and cables may lead from the control panel or reservoir to the cleaning head 125 so the cleaning head can utilize materials, and a control panel 155 can instruct the cleaning head's movements and actions. Although the tube is shown in the drawings, the tube may alternatively represent a cable or otherwise host a series of wires, cables, or tubes that are transmitted to the cleaning head.

The cleaning device 105 includes the control panel 155, or computing device, that controls the cleaning device's various operations. The control panel includes a user interface (UI) 160 that can interact with a user through its input/output (I/O) capabilities. Although a touchscreen display is shown, other I/O devices may also be utilized with the control panel, such as a keyboard, numerical pin pad, a microphone, speakers, pointers, voice recognition, visual signals, etc. Alternatively, the cleaning device may employ a network interface that can communicate with an external computing device, like a smartphone, tablet, laptop, desktop, or remote service.

The cleaning device 105 includes manual vertical height adjustment components 120 that enable a user to vary the height of the cleaning device's overall positioning relative to the conveyor belt 130. Multiple vertical height adjustments are in place to provide greater customization to the user when adjusting the height. The vertical height adjustments include a knob that controls a threaded shank that can lift or drop that particular side of the cleaning device. While manual height adjustments are possible, z-axis actuators may alternatively be used, as discussed in greater detail below.

The control panel 155 may be connected to a power source 170, such as a battery or otherwise plug that connects to an outlet. The power source provides power to the cleaning device's components, including the control panel, cleaning head 125, etc.

Figure 2:
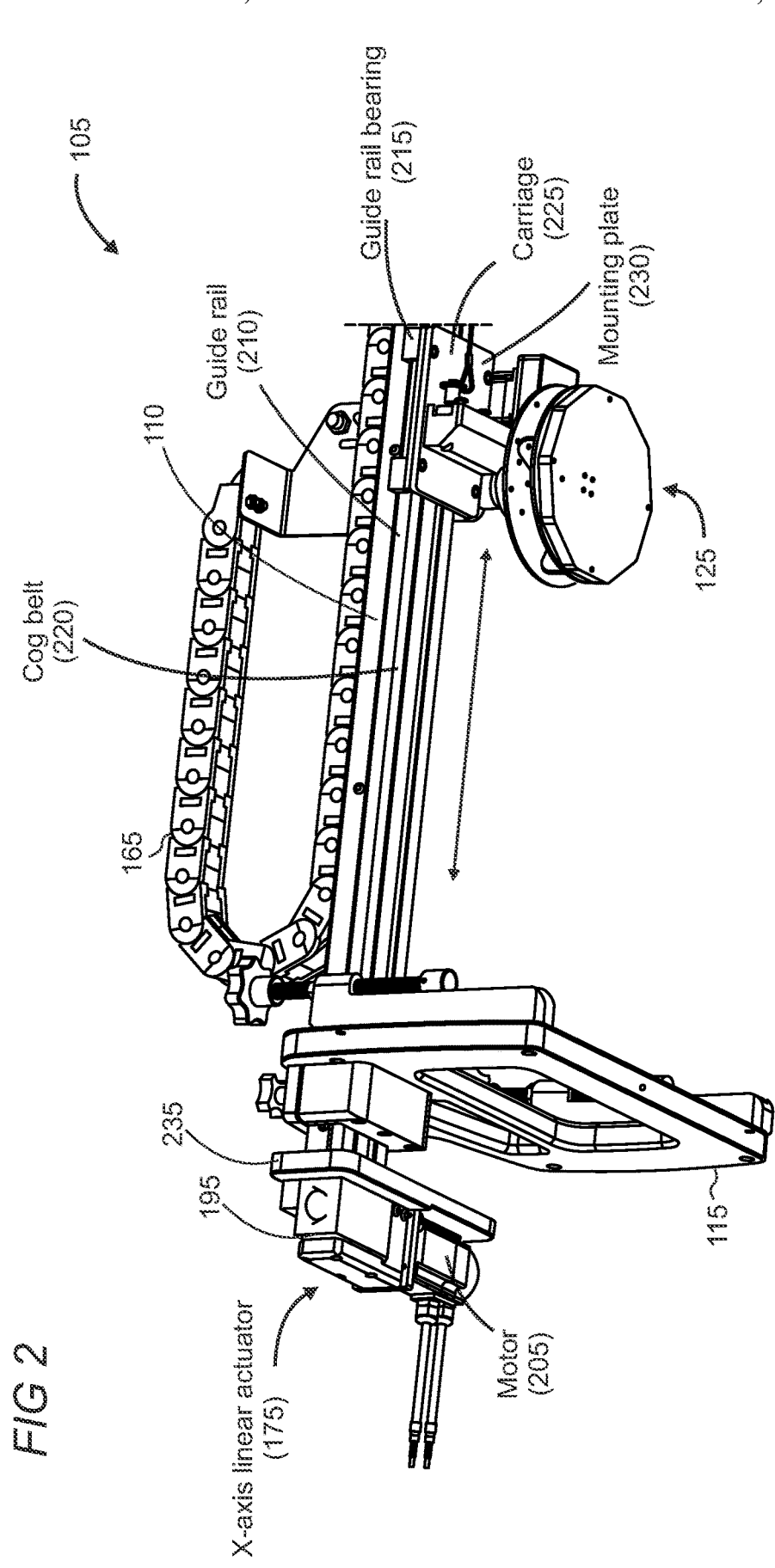
FIG. 2 shows an illustrative representation of the x-axis carriage that causes lateral movements of the cleaning head.

FIG. 2 shows an illustrative representation in which a sliding carriage 225 is attached to a guide rail 210 on an underside of the cleaning device 105. The carriage 225 and associated mounting plate 230 provide sufficient support to withstand rigorous movements facilitated by the linear actuator 175. The mounting plate and carriage utilize the guide bearings, such as a roller, plate, or block, to facilitate carriage and cleaning head 125 movements. The guide rail is connected to a cog belt, which moves responsive to the x-axis linear actuator 175. Although only the motor 205 is marked in FIG. 2, other linear actuator operational components may be associated therewith. Triggered movement by the actuator extends to the cog belt, translating to the cleaning head's x-axis movements through the carriage. The cleaning head may be offset from the guide rail so the cleaning head can receive cables, tubes, etc., from the wire carriage 165 (FIGS. 1A-B).

The carriage 225 is the element that moves along the guide rail 210 and supports the attached load, such as the cleaning head 125. The linear guides implemented may be, for example, sliding contact guides or roller bearing guides. In sliding contact guides, such as the guide rail bearings 215, the sliding carriage slides over the rail, which may use some lubricant. In roller bearing guides, roller bearings are located inside the sliding carriage 225. The addition of the roller bearing helps reduce the coefficient of friction between the carriage and the guide rail, reducing the force required to move the carriage without necessarily requiring lubrication. The design of the rails for these guides will include grooves for the roller bearings to move along.

Figure 3:
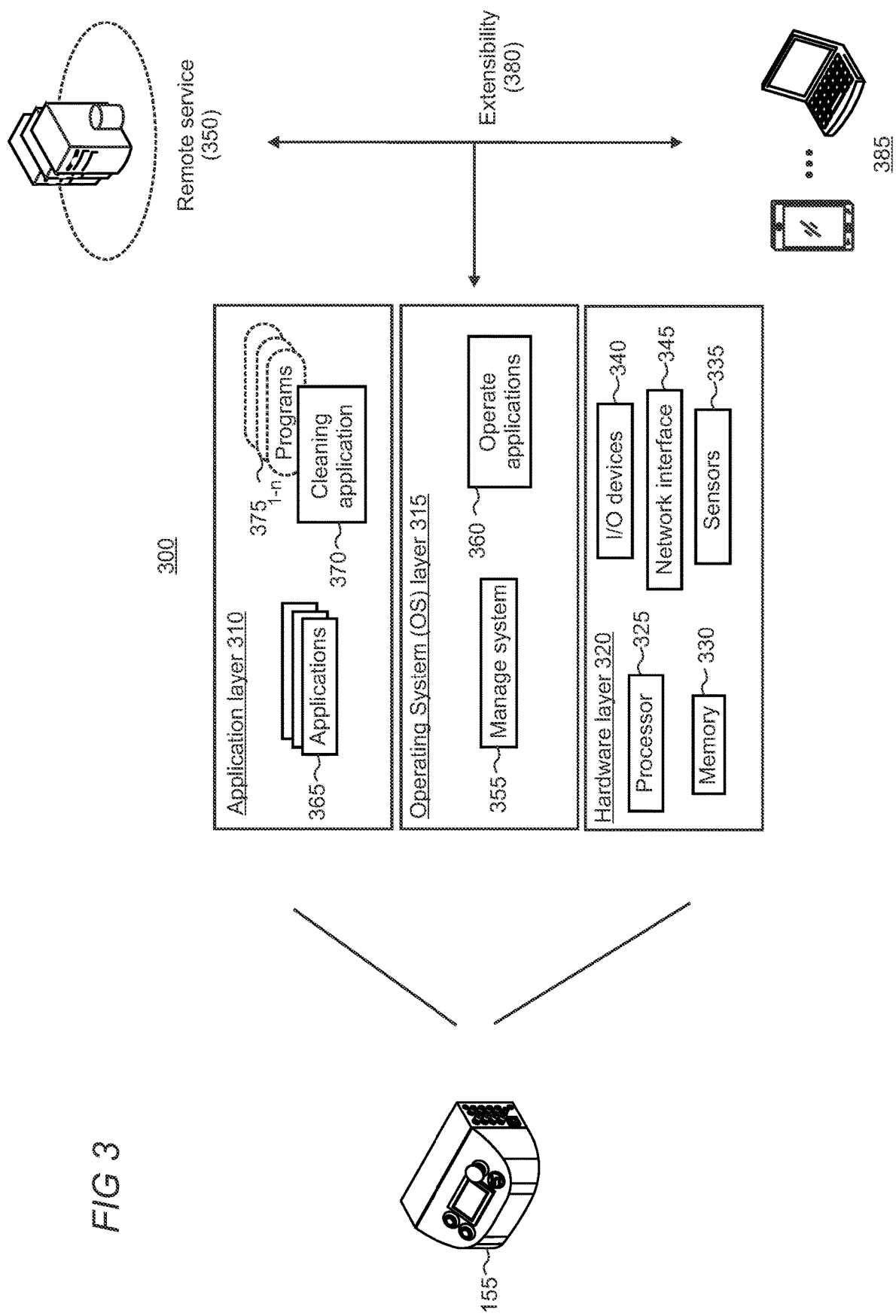
FIG. 3 shows an illustrative layered architecture of the cleaning device's control panel.

FIG. 3 shows a simplified layered architecture 300 of the cleaning device's control panel 155, or computing device, which controls at least some of the cleaning device's operations. The control panel can include a hardware layer 320, operating system (OS) layer 315, and application layer 310. The hardware layer 320 provides an abstraction of the various hardware used by the control panel 155 (e.g., input and output devices, networking and radio hardware, etc.) to the layers above it. In this illustrative example, the hardware layer supports processor(s) 325, memory 330, input/output devices (e.g., mouse, keyboard, touchscreen display 160) 340, network interface (e.g., network interface card) 345, and sensors 335. The network interface may support an ethernet connection, Wi-Fi connectivity to a router, or short-range communications over Bluetooth® or NFC (Near Field Communication), such as to a user's computing device (e.g., smartphone, tablet computer, personal computer (PC), laptop, etc.).

The application layer 310 in this illustrative example supports various applications 365, including a cleaning application 370 that facilitates the cleaning head's cleaning of conveyor belts. As shown, the cleaning application may utilize user-created or pre-made programs 375 and installed at the control panel 155. The cleaning application references and executes the programs when cleaning a conveyor belt.

Leveraging the network interface 345, the cleaning application 370 may be configured with extensibility 380 to communicate with external computing devices, such as remote service 350 and user computing device 385. For example, the user devices may be instantiated with the cleaning application to thereby enable remote control or assessment over the cleaning device. The user devices may see whether the cleaning device 105 is operating, its completion level, and other status information (FIGS. 23 and 24), as discussed in greater detail below. The remote service may also be configured with a cleaning application 370 that remotely controls the cleaning device's operations. For example, the remote service may receive data gathered by a cleaning device's sensors 335 and responsively instruct the cleaning device to adjust its operations. The remote service may be in communication with multiple distinct cleaning devices at different or the same sites and, in that regard, operates as a Software as a Service (SaaS).

The OS layer 315 supports, among other operations, managing system 355 and operating applications/programs 360. The OS layer may interoperate with the application and hardware layers in order to perform various functions and features.

Figure 4:
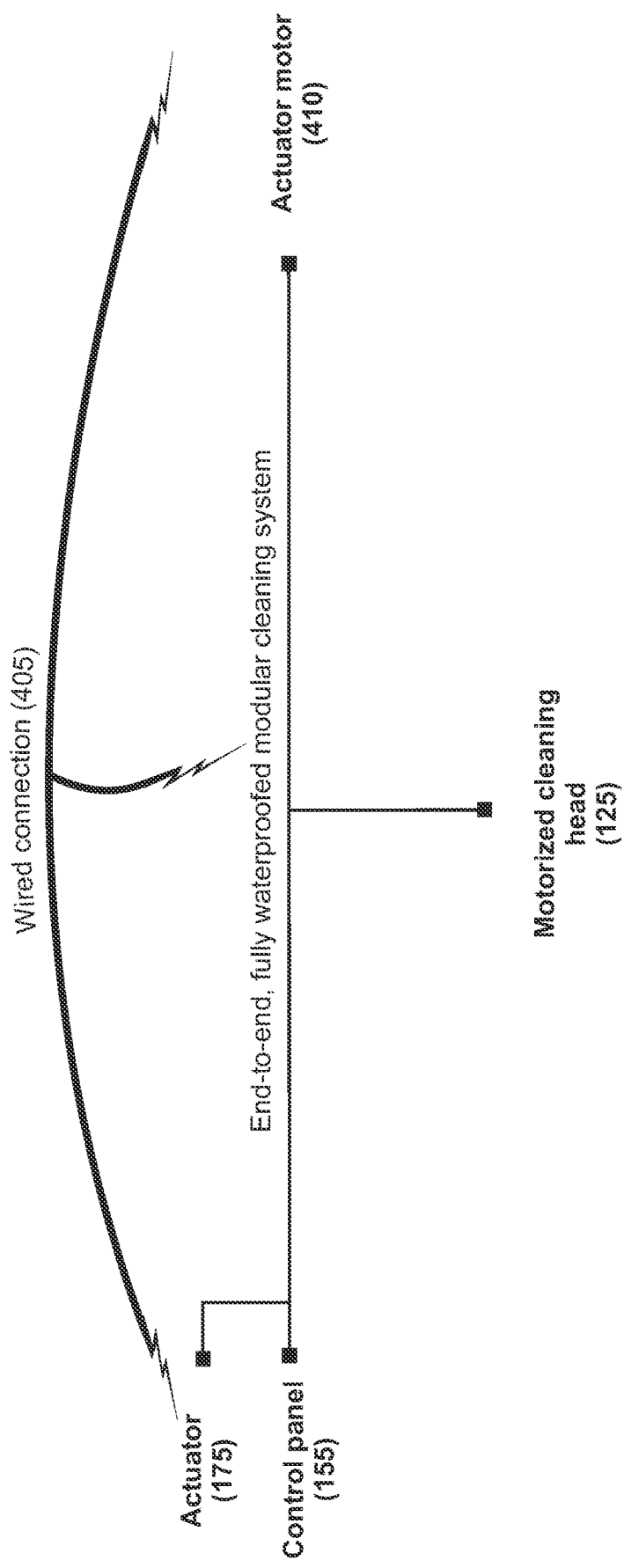
FIG. 4 shows an illustrative schematic representation of the waterproof cleaning system.

FIG. 4 shows an illustrative schematic representation in which the conveyor belt cleaning system 105 is fully waterproof from end-to-end, thereby prolonging the shelf-life of the system's individual components and preventing downtime due to electrical failures, rust, debris interfering with a component's (e.g., motor's) operations, among other benefits. References to "end-to-end" or the system being waterproof is typically directed to electrical or corrosion-sensitive components, such as certain components associated with the actuator 175 and the cleaning head 125. For example, the actuator's motor, bearings, and pullies are located within the IP56 or IP65 sealed enclosure at either end of the actuator, including the sealed within the frame 110 and end caps 195. For example, the frame 110 seals off the actuator's liquid- or corrosion-sensitive components so that it can operate without having liquid, debris, etc. touch them. Other electrical components, such as within the control panel 150, are IP56 protected. There is a wired connection 405 among the various components, namely the control panel 155, each end and all the components of the actuator 175, and the modular cleaning head 125. Each connection mechanism between these components is fully sealed and waterproof, such as using a gasket, to prevent water, liquid, or other debris from entering the components and preventing their operation.

In typical implementations, the actuator 175 extends across an entire horizontal width of the cleaning system 105 and the conveyor belt 130 or other movable surface so that the cleaning head 125 can clean the belt's entire surface. The actuator extends from its operational motor on one horizontal end of the conveyor belt and an opposite end adjacent to the control panel. The control panel 155 is communicatively connected to various operable components associated with the cleaning system, including the modular cleaning head 125, and the actuator's motor 410 positioned on the adjustable end frame 115 on an opposite end of the control panel, among other operable components. These connections are waterproofed to prevent damage and downtime to the system. The wires that extend throughout the cleaning system and connect the various components are housed and sealed inside a hose, and the hose's connectors are waterproofed with a gasket such that only the metallic connection mechanism is exposed when inserted into a receptacle.

Furthermore, as shown in FIG. 4, the end of the actuator 175 is completely separate from and external to the control panel 155 such that no portion of the actuator's operable components are inside the control panel's housing. Such a design helps waterproof the system. The control panel 155 controls the actuator's movements via a waterproof connection between the two components, as discussed in greater detail below.

Figure 5:
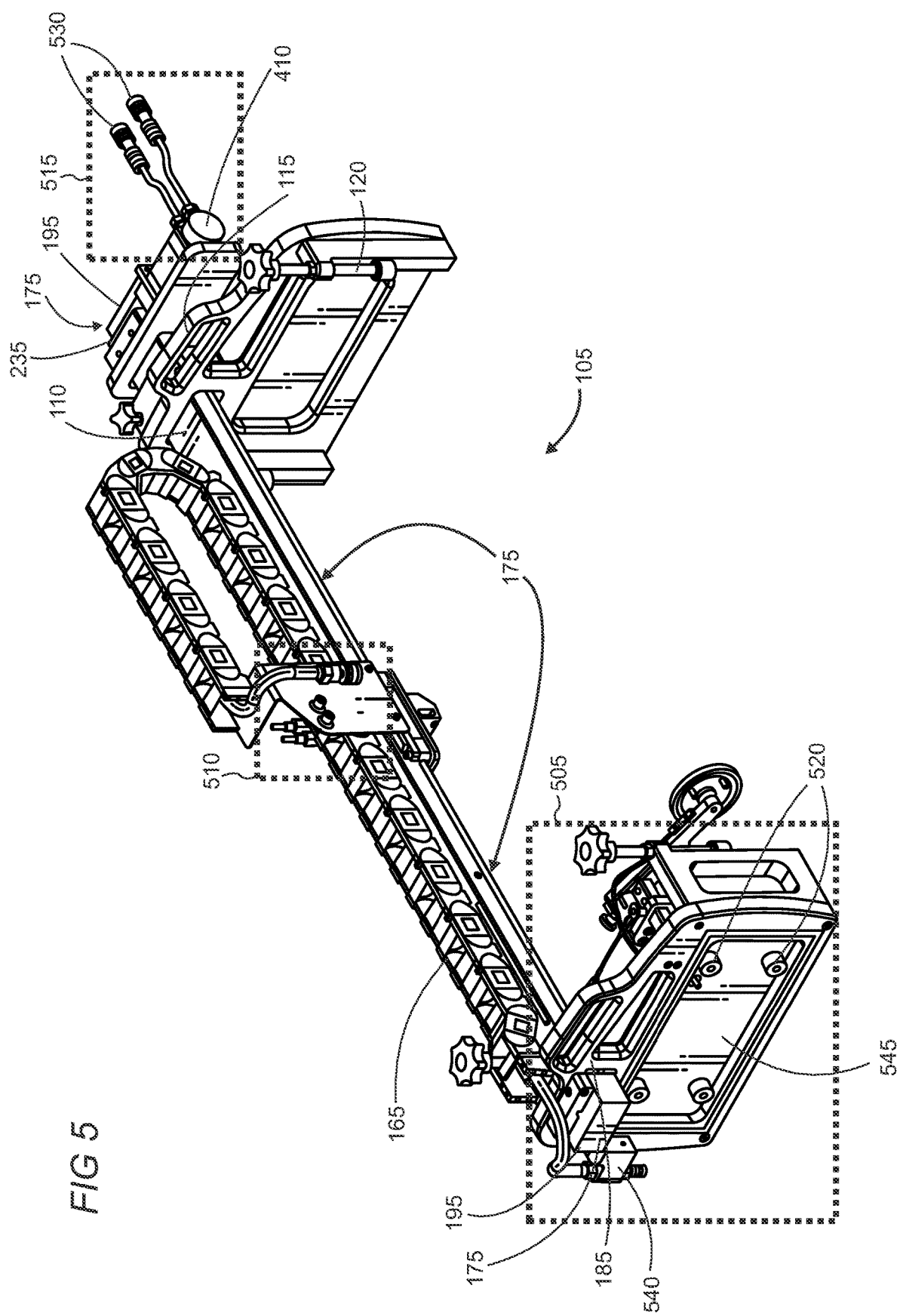
FIG. 5 shows an illustrative environment in which the conveyor belt cleaning system is waterproofed at multiple locations to create a fully end-to-end waterproofed system.

FIG. 5 shows an illustrative representation of the conveyor belt system's physical components, schematically represented in FIG. 4, being waterproofed at various locations throughout the cleaning system 105. Waterproofed locations, represented by the boxes in broken lines, include the control panel location 505, modular head connector location 510, and the actuator-motor location 515. Each of these waterproof locations has some connection to each other, affecting the operation of the conveyor belt cleaning system 105. So, if one location or portion of the conveyor belt cleaning system is contaminated with water, liquid, foodstuffs, or other debris, the entire machine may face downtime due to breakage.

FIGS. 6A and 6B show illustrative representations in which the modular head location 510 has multiple waterproof connectors. For example, frame connector assemblies 605 are waterproofed using individual gaskets 640, as shown in FIG. 6B. The connector assemblies 605 are structured with a connectivity wire 605, which connects the modular head 125 to the control panel 155 to enable control signals from the control panel to control the modular head. The wire extends through an opening 635 in the frame, which is then sealed using a gasket 640. The endpoint connector 645 is secured to the gasket and frame and has an exposed contact point 650 to enable electrical signals, such as between the control panel and the modular head, to pass through. As the connector assemblies 605 are completely sealed pursuant to IP56 standards, water cannot enter and cause short circuits or other problems with the electrical components.

The modular cleaning head's connecting arm 650 attaches to the frame at its opening 625. The modular cleaning head 125 has a motor 615 that is IP56 sealed within housing 620 to prevent water, liquid, foodstuffs, etc., from entering the electromechanical components of the motor that rotate the modular head. A gasket 660 may be positioned between the housing's cap 665 and the housing's base so that, when assembled, liquid cannot enter the motor's internal electromechanical components. While the actuators control various x, y, and z movements of the modular head, the motor 615 controls the radial motion of the modular head's spinning disc 655. The control panel 155 controls the modular head's various operations, including how the actuator controls its directional movement and the rotation of the spinning disc 655, thereby necessitating the wired and waterproof connection between the components. Since the actuator, modular head, and control panel form a complete system, their end-to-end waterproofing ensures long-term reliability and operation. While a single modular cleaning head with a spinning disc is shown and described herein, other cleaning heads are also possible and may similarly be configured with IP56 standard waterproofed connectors and components.

The modular head's connectors 610 may connect with the frame's connector assemblies 605 to enable signals to transfer between the control panel 155 and the cleaning head 125. Similar to the connector assemblies 605 shown in FIG. 6B, the connectors 610 on the cleaning head may be similarly constructed, with an opening housing a wire, a gasket sealing the opening, and an end connector and contact point to provide the electrical connection.

Referring back to FIG. 5, similar to the waterproofing configuration of the cleaning head's motor 615, the actuator's motor 410 may be sealed with a gasket between its cap and base to IP56 seal the motor from exterior liquid or debris. The actuator's connectors 530 are also sealed with gaskets between its openings, such as using a gasket at its opening and connection point between the connector's body, such that only its metallic contact points are exposed.

FIG. 7 shows an illustrative exploded assembly of the control panel 155 and its connection to the conveyor belt cleaning system's backplate 185, which forms part of the conveyor belt cleaning system's frame. The backplate has a channel 710 into which the gasket 705 enters. The control panel 155 may have a corresponding channel on its rear end that likewise engages with the gasket or, alternatively, may be a flat surface. The control panel's channel is positioned around its perimeter so that no water can bypass the gasket, thereby waterproofing its interior components comprised of various electrical and computer equipment, such as memory devices, processors, printed circuit boards, wires, network interface cards, connectors, etc. While the gasket seals the internal components of the control panel, display gasket 715 prevents water from entering the opening 720 that the display covers. The display gasket extends around the perimeter of the display 160 and rests against the control panel's housing, preventing liquid, water, foodstuffs, debris, etc., from entering.

During assembly, a user may engage screws or bolts 725 from inside the control panel 155 into the connectors 550 on the backplate 185. The user may access the control panel through the opening 720, insert the bolts or screws through holes in the rear of the control panel (not shown), and attach the bolts or screws into the connectors before setting up the display 160, that is, securing the display to the control panel's housing. The display 160 is also a waterproof display that, for example, is waterproof per IP56 standards, but may be adapted with a waterproof rating of IP66.

Figure 8:
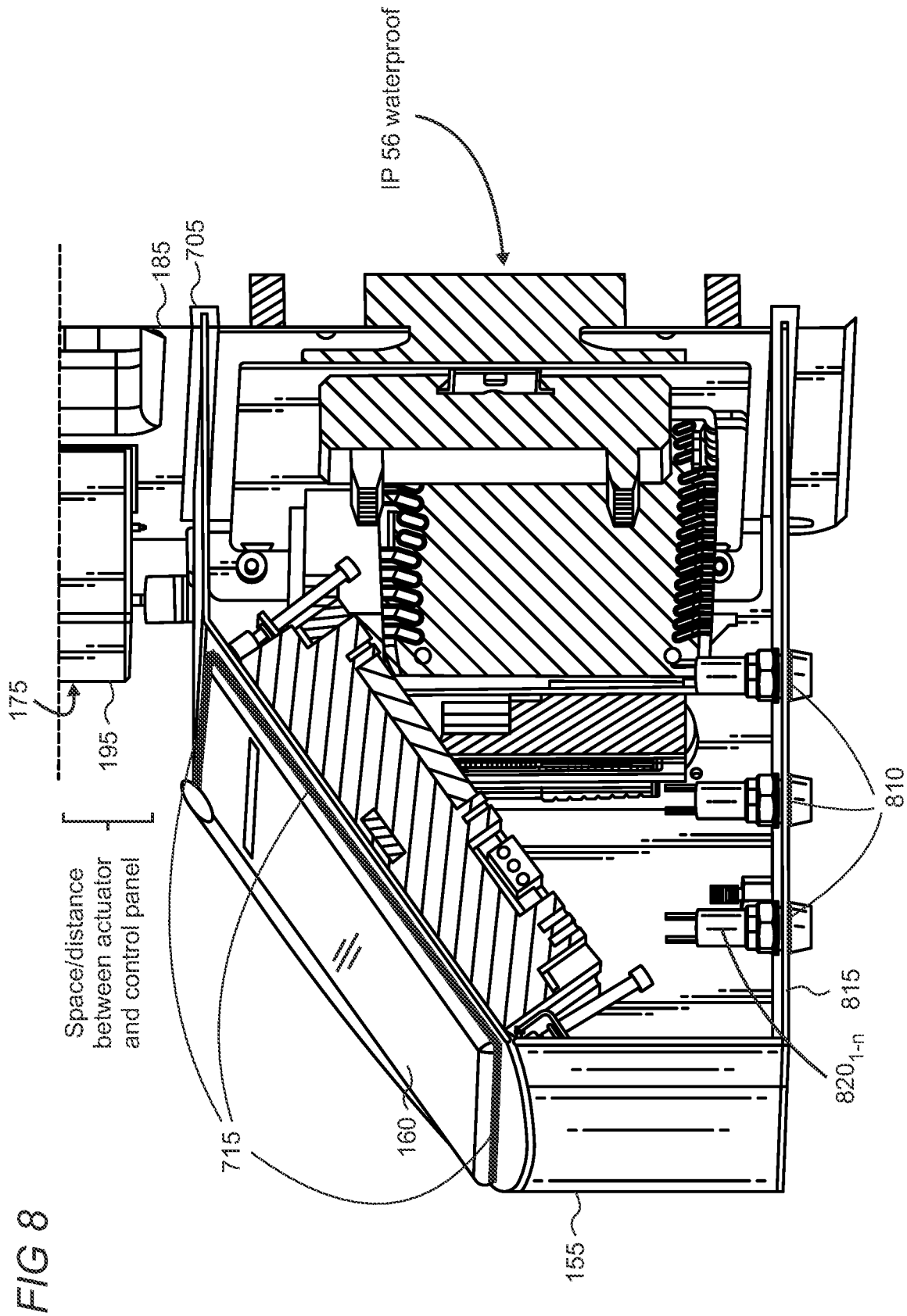
FIG. 8 shows an illustrative cross-sectional view of the control panel and the various gaskets used to waterproof its electrical components.

FIG. 8 shows an illustrative representation of a cross-sectional view of the control panel 155 and its relation to the remainder of the conveyor belt cleaning system's frame. The display 160 is attached to the opening 720 in the control panel and is waterproofed using the gasket 715 around its perimeter, preventing water, liquid and other debris from entering the opening 720 and short-circuiting and potentially destroying the control panel's internal electrical and computer components. Gaskets 810 are positioned at the base 815 on the housing exterior to seal and prevent liquid and debris from entering the openings at the fuse holders 820. The fuses may need to be periodically changed so is available for the user to pull out via some press-fit mechanism or may be threaded. The gaskets 810 and overall configuration of the control panel housing enables a user to still access the fuses, when necessary, while still safeguarding the control panel's circuitry and components with an IP56 rating. FIG. 8 further shows a portion of the gasket 705 against the backing plate 185, sealing the inside of the control panel 155 from any liquid that touches or engages the backing plate, according to IP56 standards.

Furthermore, the actuator 175, sealed within frame 110 and having sealed end caps 195, is positioned above the control panel 155 and completely external to the control panel, as shown by the space/distance between the two. The sealed frame 110 and end caps 195 around the actuator may also be sealed with a gasket against the backing plate 185 and bracket 235 (FIG. 2). The actuator extends through an opening in the backing plate to provide sufficient support to the actuator's body. The intentional separation of the two electrical components, the control panel and the actuator, was configured to fully waterproof the individual components and thereby meticulously and strategically control where connections and openings occur so as to reduce the number of possible locations where liquid can enter, and enable user-selected control over how those connections are arranged and sealed.

Figure 9:
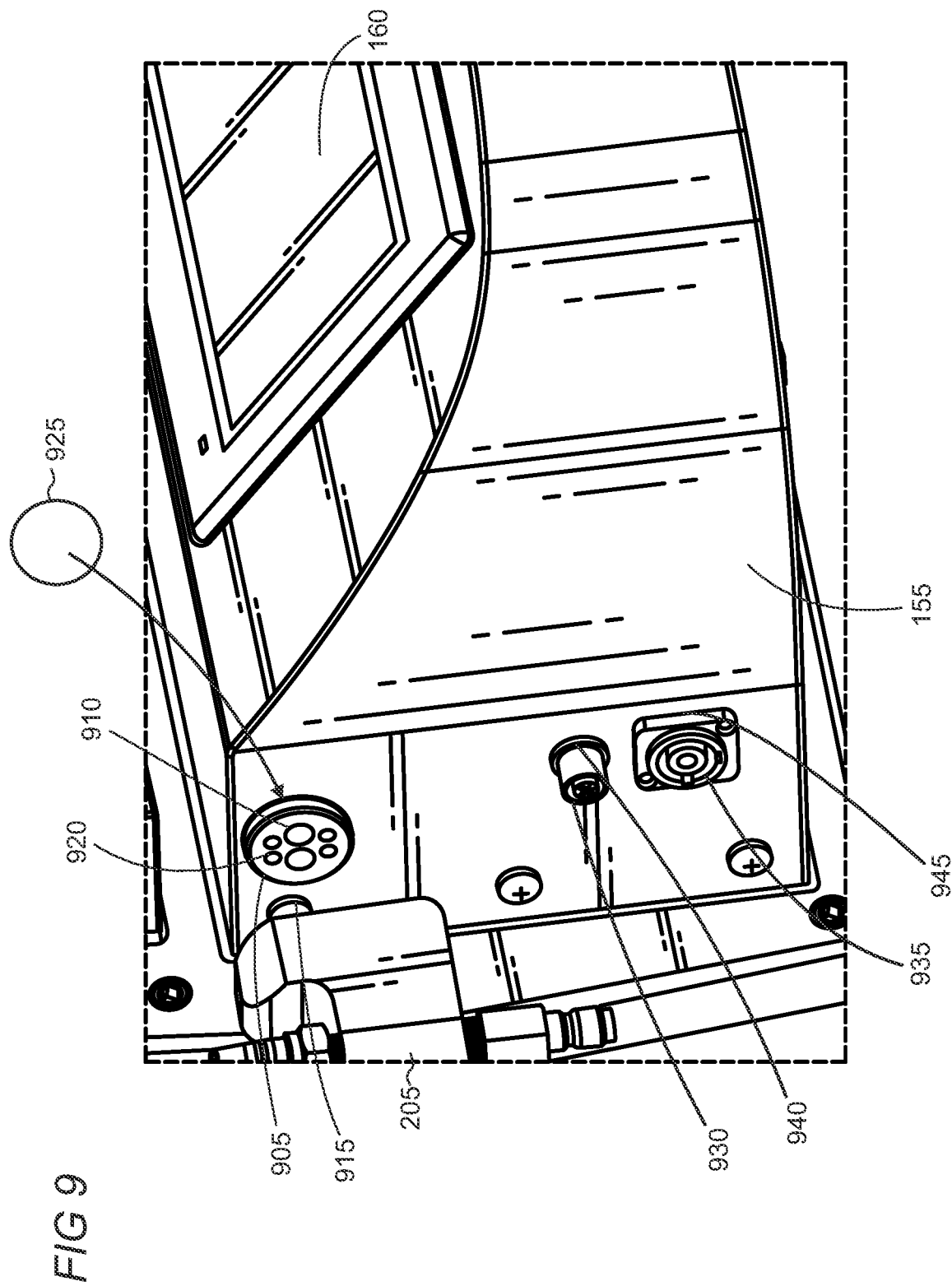
FIG. 9 shows an illustrative representation of the actuator's waterproof connection with the control panel.

For example, FIG. 9 shows an illustrative representation in which the control panel 155 has a connection point 905 having a mechanical receptacle 910 and contact points 920 that enable electrical signals to flow to and from the control panel. The waterproof plug 205 has a corresponding connector 915 that mechanically engages and secures to the connector 905 and has corresponding contact points to allow the free flow of signals between the components. The connector 905 likewise has a gasket 925 around its perimeter, similar to the configuration shown in FIG. 6B, to prevent any liquid from entering the control panel. This way, the control panel's initialization of the conveyor belt cleaning system 105 can control the actuator's operation without the actuator having any interior access to the control panel aside from the plug 205 and connector 905.

FIG. 9 also shows additional connectors that are configured with an IP56 rating to enable the control panel to connect to external components while still maintaining its water- and dust-proofing configuration. Connectors 930 and 935, while different shapes to accommodate distinct and dedicated connections, each have gaskets 940, 945 at its backside to waterproof their connections inside the control panel 155.

Figure 10:
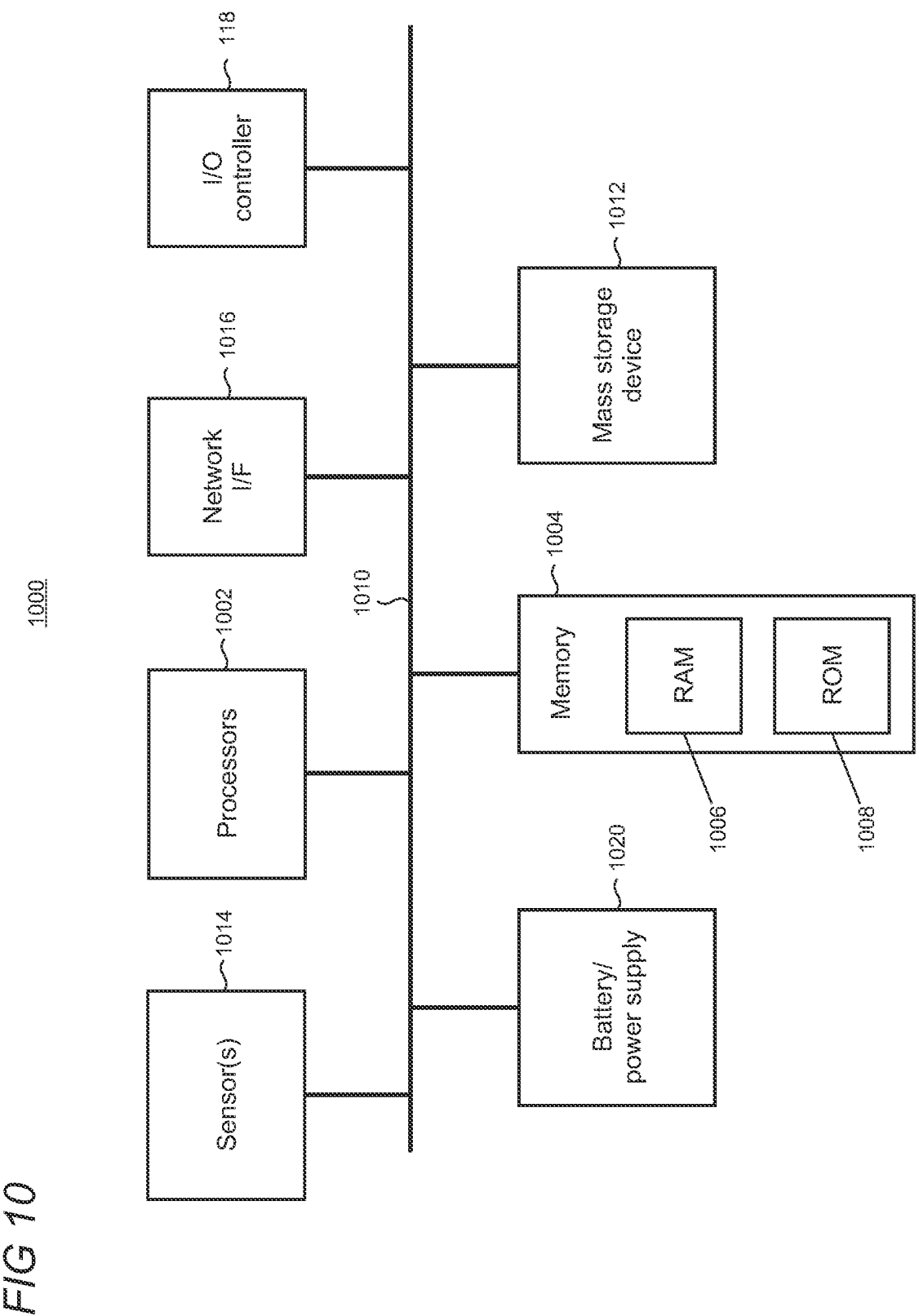
FIG. 10 is a simplified block diagram of an illustrative architecture of a control panel or user computing device that may be used at least in part to implement the present waterproofing of a modular head cleaning system.

FIG. 10 shows an illustrative architecture 1000 for a computing device such as the control panel 155 or user computing device (e.g., laptop computer, desktop computer, smartphone, etc.) that may be used to control the operations for the present waterproofing of a modular head cleaning system. For example, the architecture may control the blower generation from the computing device 295. The architecture 1000 may be non-exhaustive for a given computing device but may be utilized to execute the functions described herein.

The architecture 1000 illustrated in FIG. 10 includes one or more processors 1002 (e.g., central processing unit, dedicated Artificial Intelligence chip, graphics processing unit, etc.), a system memory 1004, including RAM (random access memory) 1006 and ROM (read-only memory) 1008, and a system bus 1010 that operatively and functionally couples the components in the architecture 1000. A basic input/output system containing the basic routines that help to transfer information between elements within the architecture 1000, such as during startup, is typically stored in the ROM 1008. The architecture 1000 further includes a mass storage device, 1012 for storing software code or other computer-executed code that is utilized to implement applications, the file system, and the operating system. The mass storage device 1012 is connected to the processor 1002 through a mass storage controller (not shown) connected to the bus 1010. The mass storage device 1012 and its associated computer-readable storage media provide non-volatile storage for the architecture 1000. Although the description of computer-readable storage media contained herein refers to a mass storage device, such as a hard disk or CD-ROM drive, it may be appreciated by those skilled in the art that computer-readable storage media can be any available storage media that can be accessed by the architecture 1000.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read-only memory), EEPROM (electrically erasable programmable read-only memory), Flash memory or other solid-state memory technology, CD-ROM, DVD, HD-DVD (High Definition DVD), Blu-ray, or other optical storage, a magnetic cassette, magnetic tape, magnetic disk storage or other magnetic storage device, or any other medium which can be used to store the desired information and which can be accessed by the architecture 1000.

According to various embodiments, the architecture 1000 may operate in a networked environment using logical connections to remote computers through a network. The architecture 1000 may connect to the network through a network interface unit 1016 connected to the bus 1010. It may be appreciated that the network interface unit 1016 also may be utilized to connect to other types of networks and remote computer systems. The architecture 1000 also may include an input/output controller 1018 for receiving and processing input from a number of other devices, including a keyboard, mouse, touchpad, touchscreen, control devices such as buttons and switches, or electronic stylus (not shown in FIG. 10). Similarly, the input/output controller 1018 may provide output to a display screen, user interface, a printer, or other output device types (also not shown in FIG. 10).

It may be appreciated that the software components described herein may, when loaded into the processor 1002 and executed, transform the processor 1002 and the overall architecture 1000 from a general-purpose computing system into a special-purpose computing system customized to facilitate the functionality presented herein.

The processor 1002 may be constructed from any number of transistors or other discrete circuit elements, which may individually or collectively assume any number of states. More specifically, the processor 1002 may operate as a finite-state machine in response to executable instructions contained within the software modules disclosed herein. These computer-executable instructions may transform the processor 1002 by specifying how the processor 1002 transitions between states, thereby transforming the transistors or other discrete hardware elements constituting the processor 1002.

Encoding the software modules presented herein also may transform the physical structure of the computer-readable storage media presented herein. The specific transformation of physical structure may depend on various factors in different implementations of this description. Examples of such factors may include but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1000 may further include one or more sensors 1014 and a battery or power supply 1020. The sensors may be coupled to the architecture to pick up data about an environment or a component, including temperature, pressure, etc.

Exemplary sensors can include a thermometer, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1000 in order to store and execute the software components presented herein. It also may be appreciated that the architecture 1000 may include other types of computing devices, including wearable devices, handheld computers, embedded computer systems, smartphones, PDAs, and other types of computing devices known to those skilled in the art. It is also contemplated that the architecture 1000 may not include all of the components shown in FIG. 10, may include other components that are not explicitly shown in FIG. 10, or may utilize an architecture completely different from that shown in FIG. 10.

Various exemplary embodiments are disclosed herein. In one exemplary embodiment, disclosed is a waterproofed modular head cleaning system, comprising: a backing plate; a control panel attached to the backing plate, wherein a gasket is placed between the control panel's rear end and the backing plate; a display screen attached to the control panel's front end, wherein a gasket is positioned between the display screen and the control panel's front end; and an actuator that extends across an entire width of a movable surface, and a control panel end of the actuator engages with the backing plate and an opposing end of the actuator on an opposite end of the movable surface is engaged to an adjustable end frame, wherein the gaskets are in place to prevent liquid from entering the control panel's electrical components.

In another example, the actuator's motor is positioned on the adjustable end frame, and wherein the actuator's motor is waterproof sealed within a housing using a gasket between the actuator's cap and base. As a further example, the actuator's operational components are completely separate from the control panel. In another example, a wire extends from the actuator to the control panel via a waterproof connection. As another example, a cleaning head that connects to a frame of the waterproofed modular head cleaning system, and the electrical connection between the cleaning head and the frame is waterproofed using gaskets. In another example, bolts extend from an interior of the control panel through to the backing plate, and the gasket is positioned between the backing plate and the control panel. As another example, the backing plate includes a channel inside which the gasket is placed. As another example, a display gasket that is positioned between the display and the control panel's housing to prevent liquid or debris from entering the control panel's opening. In a further example, a connector on the control panel that is sealed with a gasket, wherein the connector connects to a plug that is connected to the actuator. In another example, the connector includes a mechanical receptacle to connect to the plug and metallic contact points to allow the flow of electrical signals to and from the actuator. In another example, the cleaning head's motor is sealed with a gasket to prevent liquid or debris from entering its electromechanical components. As another example, portions of the waterproofed modular cleaning system is IP56 waterproof from end-to-end, including its actuator motor, the actuator's components, the control panel, the cleaning head, and connectors.

In another exemplary embodiment, disclosed is a method of waterproofing a modular head cleaning system, comprising: providing a backing plate; providing a control panel attached to the backing plate, arranging a gasket between the control panel's rear end and the backing plate; attaching a display screen to the control panel's front end, wherein a gasket is positioned between the display screen and the control panel's front end; and providing an actuator that extends across a width of a movable surface, and a control panel end of the actuator engages with the backing plate and an opposing end of the actuator on an opposite end of the movable surface is engaged to an adjustable end frame, wherein the gaskets are in place to prevent liquid from entering the control panel's electrical components. As another example, placing the actuator's motor on the adjustable end frame, and wherein the actuator's motor is waterproof sealed within a housing using a gasket between the actuator's cap and base. As another example, the actuator's operational components are completely separate from the control panel. In another example, a wire extends from the actuator to the control panel via a waterproof connection. As another example, connecting a cleaning head to a frame, and the electrical connection between the cleaning head and the frame is waterproofed using gaskets. As another example, attaching bolts from an interior of the control panel through to the backing plate, and the gasket is positioned between the backing plate and the control panel. In another example, the backing plate includes a channel inside which the gasket is placed. As another example, a display gasket that is positioned between the display and the control panel's housing to prevent liquid or debris from entering the control panel's opening.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A waterproofed modular head cleaning system, comprising:
    an actuator that extends across an entire width of a movable surface that the modular head cleaning system cleans, wherein the actuator has a control panel end on one side of the movable surface and an opposing end on an opposite side of the movable surface; and
    a control panel, positioned on the control panel end of the actuator, having a housing including a rear plate, wherein the rear plate is positioned on an actuator side of the modular head cleaning system, wherein the control panel's interior includes at least electrical circuitry adapted to control the modular head cleaning system,
    wherein the actuator is external to the control panel's housing to waterproof the control panel's interior electrical circuitry.

2. The waterproofed modular head cleaning system of claim 1, further comprising a rear plate gasket positioned between a rear end of the control panel and the rear plate.

3. The waterproofed modular head cleaning system of claim 1, further comprising a display screen attached to a front end of the control panel, wherein a display gasket is positioned between the display screen and the control panel's front end.

4. The waterproofed modular head cleaning system of claim 1, wherein a motor of the actuator is positioned on an adjustable end frame on the opposing end of the actuator, and wherein the motor is waterproof sealed within a housing by a gasket between a cap and base of the actuator.

5. The waterproofed modular head cleaning system of claim 4, wherein the actuator's operational components are completely separate from the control panel.

6. The waterproofed modular head cleaning system of claim 5, wherein a wire extends from the actuator to the control panel via a waterproof connection.

7. The waterproofed modular head cleaning system of claim 6, further comprising a cleaning head that connects to a frame of the waterproofed modular head cleaning system, and the electrical connection between the cleaning head and the frame is waterproofed by a connector gasket between a connector and the frame.

8. The waterproofed modular head cleaning system of claim 6, wherein fasteners are utilized at the rear plate while a rear plate gasket maintains its position between the rear plate and the control panel.

9. The waterproofed modular head cleaning system of claim 8, wherein the rear plate includes a channel inside which the gasket is placed.

10. The waterproofed modular head cleaning system of claim 3, wherein the display gasket is positioned around an opening on the control panel's front end housing to prevent liquid or debris from entering the control panel's opening.

11. The waterproofed modular head cleaning system of claim 10, further comprising a connector on the control panel that is sealed with a gasket, wherein the connector connects to a plug that is connected to the actuator.

12. The waterproofed modular head cleaning system of claim 11, wherein the connector includes a mechanical receptacle to connect to the plug and metallic contact points to allow the flow of electrical signals to and from the actuator.

13. The waterproofed modular head cleaning system of claim 12, wherein a motor of the cleaning head is sealed by a gasket to prevent liquid or debris from entering its electromechanical components.

14. The waterproofed modular head cleaning system of claim 13, wherein portions of the waterproofed modular cleaning system is IP56 waterproof from end-to-end, including its actuator motor, the actuator's components, the control panel, the cleaning head, and connectors.

* * * * *